United States Patent
Wheeler et al.

(10) Patent No.: US 11,933,929 B2
(45) Date of Patent: Mar. 19, 2024

(54) 4D SEISMIC AS A METHOD FOR CHARACTERIZING FRACTURE NETWORK AND FLUID DISTRIBUTION IN UNCONVENTIONAL RESERVOIR

(71) Applicant: ConocoPhillips Company, Houston, TX (US)

(72) Inventors: Thomas J. Wheeler, Houston, TX (US); Jane W. Mutoru, Houston, TX (US); Robert G. Keys, Houston, TX (US); Dana M. Jurick, Houston, TX (US); Mark J. Fissell, Katy, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 661 days.

(21) Appl. No.: 16/268,852

(22) Filed: Feb. 6, 2019

(65) Prior Publication Data
US 2019/0243019 A1    Aug. 8, 2019

Related U.S. Application Data

(60) Provisional application No. 62/626,840, filed on Feb. 6, 2018.

(51) Int. Cl.
| | | |
|---|---|---|
| *G01V 1/00* | (2006.01) | |
| *G01V 1/30* | (2006.01) | |
| *G01V 1/34* | (2006.01) | |

(52) U.S. Cl.
CPC ............... *G01V 1/308* (2013.01); *G01V 1/34* (2013.01); *G01V 2210/6122* (2013.01); *G01V 2210/646* (2013.01)

(58) Field of Classification Search
USPC .......................................................... 367/7
See application file for complete search history.

(56) References Cited

U.S. PATENT DOCUMENTS

| | | | | |
|---|---|---|---|---|
| 6,189,615 | B1 * | 2/2001 | Sydansk | C09K 8/5756 507/903 |
| 6,614,717 | B1 * | 9/2003 | Khan | G01V 1/005 367/46 |
| 6,978,211 | B2 * | 12/2005 | Soliman | E21B 43/26 702/13 |
| 7,242,637 | B2 * | 7/2007 | Van Den Beukel | G01V 1/30 367/37 |
| 7,577,061 | B2 * | 8/2009 | Williamson | G01V 1/30 367/38 |

(Continued)

OTHER PUBLICATIONS

Written Opinion of the ISA for PCT/US2019/016808. (5 pages) (Year: 2019).*

(Continued)

*Primary Examiner* — James R Hulka
(74) *Attorney, Agent, or Firm* — Polsinelli PC (57) ABSTRACT

A method of characterizing a subterranean formation using a plurality of seismic acquisitions includes obtaining a first seismic acquisition of the subterranean formation, wherein the first seismic acquisition is a baseline survey. Injecting a gas fluid into the subterranean formation, wherein the gas fluid at least partially fills a portion of a fracture network of the subterranean formation. Obtaining a second seismic acquisition of the subterranean formation. Calculating a time-lapse difference in the plurality of seismic acquisitions.

18 Claims, 5 Drawing Sheets

(56) References Cited

U.S. PATENT DOCUMENTS

| | | | | |
|---|---|---|---|---|
| 7,843,766 | B2* | 11/2010 | Levin | G01V 1/364 367/40 |
| 8,805,661 | B2* | 8/2014 | Li | E21B 47/00 703/10 |
| 10,386,516 | B2* | 8/2019 | Willis | G01V 1/308 |
| 2002/0013687 | A1* | 1/2002 | Ortoleva | G01V 11/00 703/10 |
| 2003/0079877 | A1* | 5/2003 | Wellington | E21B 43/30 166/272.1 |
| 2005/0125156 | A1* | 6/2005 | Soliman | E21B 43/16 702/12 |
| 2005/0149267 | A1* | 7/2005 | Van Den Beukel | G01V 1/30 702/14 |
| 2006/0076956 | A1* | 4/2006 | Sjolie | E21B 47/11 324/324 |
| 2008/0291781 | A1* | 11/2008 | Williamson | G01V 1/30 367/38 |
| 2009/0238041 | A1* | 9/2009 | Levin | G01V 1/364 367/40 |
| 2010/0004906 | A1* | 1/2010 | Searles | E21B 43/26 703/2 |
| 2010/0236784 | A1* | 9/2010 | Horton | C09K 8/58 166/305.1 |
| 2010/0252268 | A1* | 10/2010 | Gu | E21B 49/008 166/308.1 |
| 2010/0270015 | A1* | 10/2010 | Vinegar | E21B 43/2401 166/272.1 |
| 2011/0251797 | A1 | 10/2011 | Leger et al. | |
| 2012/0109603 | A1* | 5/2012 | Li | E21B 47/12 703/2 |
| 2014/0019056 | A1 | 1/2014 | Thore | |
| 2014/0165720 | A1* | 6/2014 | Edwards | G01V 7/00 73/382 R |
| 2014/0246193 | A1* | 9/2014 | Wollen | E21B 43/2401 166/250.01 |
| 2014/0343859 | A1* | 11/2014 | Willis | G01V 1/308 702/14 |
| 2015/0159079 | A1* | 6/2015 | Huh | E21B 43/16 166/248 |
| 2016/0041281 | A1 | 2/2016 | Takanashi | |
| 2019/0196039 | A1* | 6/2019 | Wilson | G01V 1/28 |

OTHER PUBLICATIONS

Int'l Search Report for PCT/US2019/016808. (2 pages) (Year: 2019).*

International Search Report for International Application No. PCT/US19/16808 dated Apr. 5, 2019 (2 pages).

Meek, Robert, et al—"Time-Lapse imaging of a hydraulic stimulation using 4D Vertical Seismic profiles and fiber optics in the Midland Basin", 2017—URTeC: 2695394; 8 pgs.

Roy, Baishali, et al—"Integrated characterization of hydraulic fracture treatments in the Barnett Shale: The Stocker geophysical experiment", 2014, Interpretation; 17 pgs.

* cited by examiner

4D SEISMIC AS A METHOD FOR CHARACTERIZING FRACTURE NETWORK AND FLUID DISTRIBUTION IN UNCONVENTIONAL RESERVOIR

PRIOR RELATED APPLICATIONS

This application is a non-provisional application which claims benefit under 35 USC § 119(e) to U.S. Provisional Application Ser. No. 62/626,840 filed Feb. 6, 2018, entitled "4D SEISMIC AS A METHOD FOR CHARACTERIZING FRACTURE NETWORK AND FLUID DISTRIBUTION IN UNCONVENTIONAL RESERVOIR," which is incorporated herein in its entirety.

FIELD OF THE INVENTION

The present invention relates to methods, systems and devices for hydrocarbon recovery from a subterranean formation. More particularly, the present invention uses time-lapse seismic surveys to characterize unconventional reservoirs.

BACKGROUND

In gas injection enhanced oil recovery (EOR), the efficiency of injected gas along a hydraulically fractured lateral is a key risk factor that drives performance. Therefore, characterization of the distribution of injected gas along a lateral is essential for enabling successful EOR technology development and deployment. An accurate characterization is difficult to achieve for several reasons.

Traditionally, seismic amplitudes and amplitude versus offset response (AVO) are strong indicators of the presence of gas in a reservoir system. However, seismic amplitudes have been poor indicators of gas saturation. Low gas saturations have a seismic amplitude response comparable to that of a reservoir with a high gas saturation. Thus, numerous dry holes have been drilled based upon false hydrocarbon indicators obtained from seismic data.

SUMMARY OF THE INVENTION

The present invention relates to methods, systems and devices for hydrocarbon recovery from a subterranean formation. More particularly, the present invention uses time-lapse seismic surveys to characterize unconventional reservoirs.

One example of the invention includes a method of characterizing a subterranean formation using a plurality of seismic acquisitions, the method including obtaining a first seismic acquisition of the subterranean formation, wherein the first seismic acquisition is a baseline survey; injecting a gas fluid into the subterranean formation, wherein the gas fluid at least partially fills a portion of a fracture network of the subterranean formation; obtaining a second seismic acquisition of the subterranean formation; and calculating a time-lapse difference in the plurality of seismic acquisitions.

Another example of the invention includes a method of characterizing a subterranean formation using a plurality of seismic acquisitions, the method includes obtaining a baseline seismic acquisition of the subterranean formation; injecting a compressible gas fluid into the subterranean formation, wherein the compressible gas fluid at least partially fills a portion of a fracture network of the subterranean formation; obtaining one or more time-dependent seismic acquisitions of the subterranean formation; and calculating a time-lapse difference in the plurality of seismic acquisitions.

BRIEF DESCRIPTION OF THE DRAWINGS

The patent or application file contains at least one drawing executed in color. Copies of this patent or patent application publication with color drawing(s) will be provided by the Office upon request and payment of the necessary fee. A more complete understanding of the present invention and benefits thereof may be acquired by referring to the follow description taken in conjunction with the accompanying drawings.

DETAILED DESCRIPTION

Reference will now be made in detail to embodiments of the invention, one or more examples of which are illustrated in the accompanying Figures. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

The present invention utilizes time-lapse seismic monitoring as a geophysical diagnostic tool for optimizing or improving hydrocarbon recovery during gas injection EOR. By tracking changes in seismic velocities and resultant elastic properties associated with gas injection, fracture network(s) can be characterized and dynamic behavior (changes) tracked over time in virtually any well/pad completed in an unconventional play.

Understanding the dynamic behavior of a fractured network (natural or induced) over time reduces the uncertainty in determining effective stimulated rock volume and allows better decision-making on well spacing and production enhancement interventions including re-fracs and EOR. These step-changes in field development of unconventional reservoir can help optimize or improve recovery of hydrocarbons. Characterization of injected gas enables optimization of injection gas efficiency, and resultant economics, of subsequent EOR projects.

The present invention is intended to solve at least two key challenges related to production optimization in unconventional reservoirs. The first challenge is characterization of the dynamic behavior of fracture network (the stimulated rock volume) over time. This involves baseline mapping of native rock, fracture mapping of initial completions to assess stimulation effectiveness, fracture mapping following period of depletion (e.g., after 1 year of depletion), and fracture mapping during gas injection EOR.

The second challenge is characterization of injected gas contact area/volume which provides an indication of injection conformance along a lateral.

In one or more embodiments, the present invention employs time-lapse (4D) seismic techniques to characterize the fracture network and track fluid saturation changes in fracture(s) due to gas injection. Time-lapse seismic methods involve acquisition, processing and interpretation of repeated seismic surveys over a reservoir to determine changes occurring in the reservoir as a result of hydrocarbon production or injection of water/gas into the reservoir by comparing datasets. 4D seismic involves collecting a number of 3D seismic datasets over a period of time. A typical final processing product is a time-lapse difference dataset (i.e., seismic data from one survey is subtracted from seismic data from another survey). Differences should be minimal except where reservoir changes have occurred.

According to some embodiments, the present invention involves the acquisition of seismic surveys covering the same area acquired over specific timeframes in the life of unconventional reservoir well:
i) Obtain baseline 3D seismic survey (native rock), typically the first seismic survey
ii) Following initial completions, perform gas injection to fill fractures and obtain 3D seismic survey
iii) Following a period of pressure depletion, perform gas injection into the fractures and obtain 3D seismic survey (subsequent surveys may be obtained throughout the depletion life as needed)
iv) During well-intervention for production optimization (e.g., well re-fracs and EOR), perform gas injection into the fracture system and obtain 3D seismic survey.

The plurality of seismic surveys acquired can be manipulated in any number of ways. These include conventional seismic data processing steps including, but not limited to, data conditioning, parameter analysis, data enhancement, migration/depth conversion, adding and/or subtracting multiple surveys, and the like. In particular, time-lapse differences between surveys can be used to determine physical parameters. These include, for example, injected gas fluid contact area or contact volume obtained by calculating difference between baseline seismic survey and seismic survey acquired after injection of gas fluid to obtain an image of fracture zones within seismic resolution. Stimulated rock volume can be obtained by calculating difference between a processed baseline seismic survey and a processed monitor seismic survey acquired after injection of a gas fluid to obtain an image of the fracture stimulated rock volume.

The gas injection involves injection of a gas fluid that includes one or more gas components. The gas components include, carbon dioxide, natural gas, nitrogen, and the like. In some embodiments, the gas fluid is compressible. In some embodiments, the gas fluid is an energized fracture fluid used to induce fractures. In some embodiments, the gas fluid can be a gas injection fluid during enhanced oil recovery. The gas fluid can be introduced into an active well and/or injection well. Once injected, the gas fluid can at least partially fill a portion of the fracture network. The resulting gas saturation level should be greater than about 3%.

According to some embodiments, the present invention provides a 2-step plan for testing the use of 4D seismic as a geophysical diagnostic tool in unconventional reservoir. First, a numerical modeling study can be conducted to assess feasibility of the technology through simulation of seismic wave propagation in a subsurface model representing a selected area of unconventional reservoir and different fluid saturations. Second, 3D seismic surveys can be acquired over specific timeframes during the lifecycle of wells in a targeted location of unconventional reservoir field. For example, subsequent surveys may be obtained approximately within 6 months, 9 months, 12 months, 15 months or throughout the depletion life as needed.

The monitoring plan involves data acquisition over 4 stages: i) baseline native rock, ii) following initial completions, iii) after about 1 year of pressure depletion, and iv) during gas injection EOR. Additional surveys may be done after each gas injection cycle in an EOR operation and/or to monitor and identify re-frac (and other well intervention) opportunities during primary depletion.

Example 1

Figure 1A:
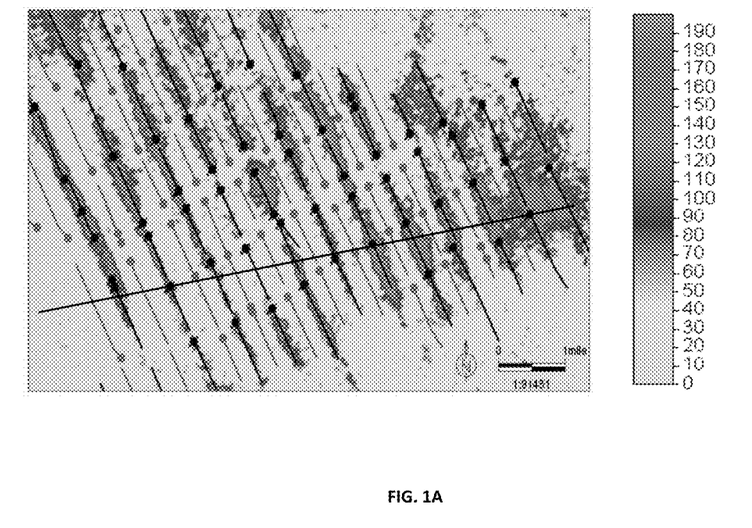
FIG. 1A and FIG. 1B illustrates an embodiment of the present invention as described in the Examples.
Figure 1B:
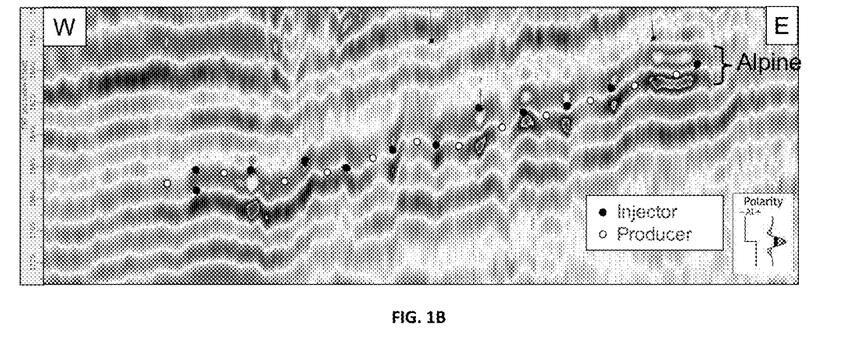

This example illustrates field-based results from a conventional reservoir. Time-lapse seismic data was acquired from a conventional reservoir to demonstrate an embodiment of the present invention. With introduction of gas into fractured reservoir, there is a change in seismic velocities. The gas saturation will typically be greater than three percent. These changes in key elastic properties are detectable and mappable with well-designed geophysical tools. FIG. 1A show time-lapse illustration mapping changes in fluid saturations. Referring to FIG. 1A, root mean square (RMS) amplitude of the time-lapse (between 1996 and 2010, before and after gas-injection) seismic difference data has been plotted over the reservoir. FIG. 1B shows a cross-section of 2010 monitor full stack. The cross-section taken from the dark black line of the time-lapse illustration. As shown, the biggest time-lapse changes in the seismic signal are mapped along fractures. The data confirms that changes in seismic signal are resolvable in gas-filled fractures.

Example 2

Figure 2A:
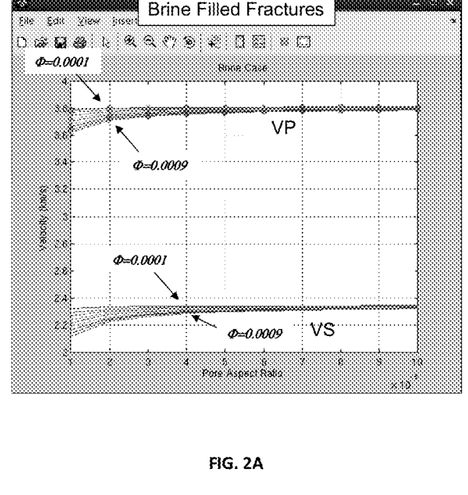
FIGS. 2A-2B illustrate P and S velocity prediction and changes in fluid filled fractures in an unconventional reservoir as a function of porosities using an isotropic model as described in the Examples.
Figure 2B:
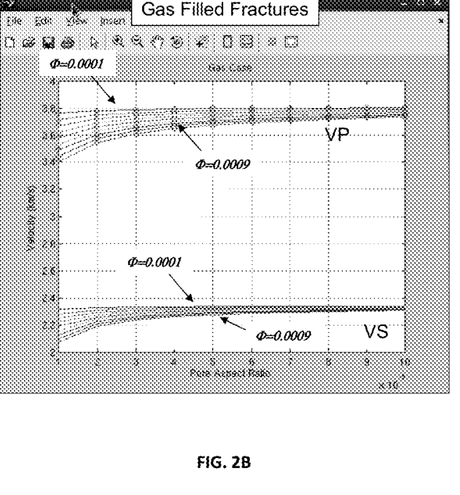

This example illustrates model-based results for unconventional reservoir. Kuster-Toksoz method was utilized to predict P ("VP") and S ("VS") velocity changes as a function of fracture porosity (FIGS. 2A-2B) in an unconventional reservoir. The method models randomly oriented (isotropic) fluid-filled fractures. FIG. 2A shows Kuster-Toksoz modeling results for brine filled fractures while FIG. 2B shows results for gas filled fractures. For example, FIG. 2B shows that P velocity can change up to about 400 m/s when fracture porosity changes from 0.0001 to 0.0009. As shown, gas filled fractures are more susceptible than brine filled fractures to changes in P velocities as fracture porosity changes. FIG. 2A and FIG. 2B show that injection of gas into fractures has a much more significant impact on P wave velocity than brine.

Figure 3:
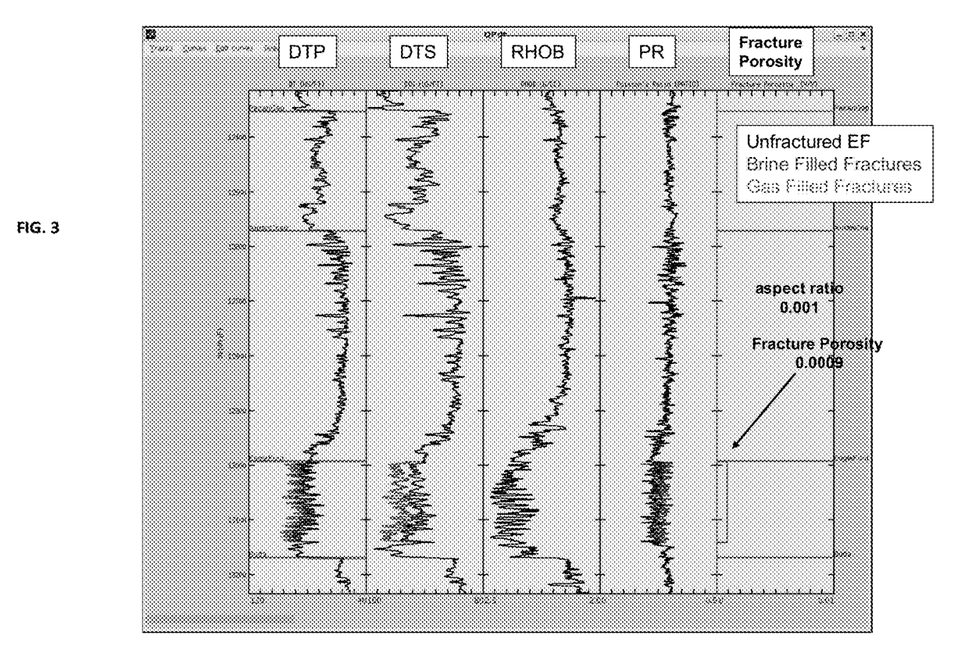
FIG. 3 illustrates an embodiment of the present invention as described in the Examples.

FIG. 3 illustrates how the velocity changes in fluid filled fractures can impact seismic data. From FIG. 3, it is evident that gas-filled fractures have a much more significant impact on P wave velocity than brine-filled fractures. From this data, the height of the fractured interval in which the gas has penetrated can be derived. Synthetic seismic results were calculated for compressional acoustic data (DTP), shear acoustic data (DTS), density log data (RHOB), Poisson's Ratio (PR), and fracture porosity.

The gas saturation in fractures markedly improves detectability of the seismic signal. The resultant velocity change is larger for gas than for brine.

Example 3

Figure 4A:
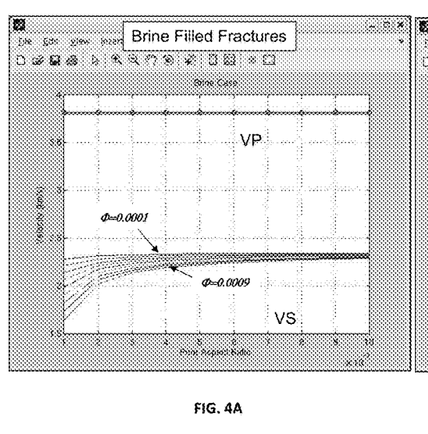
FIGS. 4A-4B illustrate P and S velocity changes in fluid filled fractures as a function of porosities using an anisotropic model as described in the Examples.
Figure 4B:
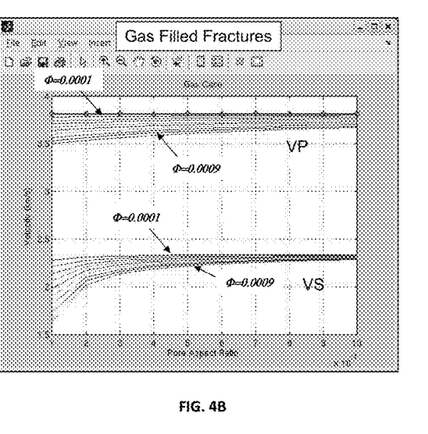

FIGS. 4A-4B illustrates Esthelby-Chang model as applied to anisotropic fluid (brine or gas) filled fractures in an unconventional reservoir. The prediction by the model (FIG. 4A) shows changes in P and S-wave velocity as fracture aspect ratio increases for fracture porosities from 0.0001 to 0.0009. Maximum change in P-wave velocity is over 200 m/s for gas filled fractures. Velocity change in the direction normal to the fracture plane is larger for gas than for brine. Even in anisotropic media, which could be more representative of the fracture system in unconventional reservoirs, the change in velocity in gas-filled fractures is high enough to be resolved.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method of characterizing a subterranean formation:
obtaining a first seismic acquisition of the subterranean formation, wherein the first seismic acquisition is a baseline survey, an initial completion being performed in the subterranean formation after the first seismic acquisition and an enhanced oil recovery operation being performed, the initial completion inducing a fracture network, the enhanced oil recovery operation including injection of a gas fluid into the subterranean formation, and the gas fluid at least partially filling a portion of the fracture network;
obtaining a plurality of second seismic acquisitions of the subterranean formation during the enhanced oil recovery operation, wherein each of the plurality of second seismic acquisitions is respectively captured following a cycle in the enhanced oil recovery operation;
calculating a time-lapse difference between the first seismic acquisition and one of the plurality of second seismic acquisitions;
determining a fluid contact parameter of the gas fluid injected during the enhanced oil recovery operation based on the time-lapse difference between the first seismic acquisition and the one of the plurality of second seismic acquisitions acquired during the enhanced oil recovery operation, the fluid contact parameter being at least one of a contact area or a contact volume; and
determining an injection conformance along a lateral of the subterranean formation based on the fluid contact parameter.

2. The method of claim 1, wherein the gas fluid is a gas injection fluid.

3. The method of claim 1, wherein the gas fluid has a gas saturation greater than about three percent in the portion of the fracture network.

4. The method of claim 1, wherein the gas fluid includes gas selected from a group comprising: carbon dioxide, nitrogen, natural gas, and any combination thereof.

5. The method of claim 1, wherein at least one of the first seismic acquisition or the plurality of second seismic acquisitions is 3D seismic acquisition.

6. The method of claim 1, further comprising:
injecting a second gas fluid into the subterranean formation following the plurality of second seismic acquisitions; and
obtaining a third seismic acquisition of the subterranean formation.

7. The method of claim 6, wherein the fracture network undergoes a period of pressure depletion before the injecting of the second gas fluid.

8. The method of claim 6, further comprising:
during a well-intervention for production optimization, injecting a third gas fluid into the subterranean formation; and
obtaining a fourth seismic acquisition.

9. The method of claim 1, wherein the fluid contact parameter is obtained based on an image of fracture zones within seismic resolution.

10. The method of claim 1, further comprising:
determining a stimulated rock volume of the subterranean formation using the time-lapse difference obtained by calculating difference between a processed baseline seismic survey and a processed monitor seismic survey acquired after the injection of the gas fluid to obtain an image of a fractured stimulated rock volume.

11. The method of claim 1, wherein the plurality of second seismic acquisitions are obtained approximately within 6 months, 9 months, 12 months, or 15 months.

12. The method of claim 1, wherein the time-lapse difference is root mean square amplitude difference.

13. A method of characterizing a subterranean formation using a plurality of seismic acquisitions:
obtaining a baseline seismic acquisition of the subterranean formation, an initial completion being performed in the subterranean formation after the baseline seismic acquisition and an enhanced oil recovery operation being performed, the initial completion inducing a fracture network, the enhanced oil recovery operation including injection of a gas fluid into the subterranean formation, and the gas fluid at least partially filling a portion of the fracture network;
obtaining one or more time-dependent seismic acquisitions of the subterranean formation following a cycle in the enhanced oil recovery operation;
calculating a time-lapse difference between the baseline seismic acquisition and one of the one or more time-dependent seismic acquisitions acquired during the enhanced oil recovery operation;
determining a fluid contact parameter of the gas fluid injected during the enhanced oil recovery operation based on the time-lapse difference, the fluid contact parameter being at least one of a contact area or a contact volume; and
determining an injection conformance along a lateral of the subterranean formation based on the fluid contact parameter.

14. The method of claim 13, wherein the gas fluid has a gas saturation greater than about three percent in the portion of the fracture network.

15. The method of claim 13, wherein the gas fluid includes one or more of carbon dioxide and nitrogen.

16. The method of claim 15, wherein the fluid contact parameter is obtained based on an image of fracture zones within seismic resolution.

17. The method of claim 13, further comprising:
determining a stimulated rock volume of the subterranean formation using the time-lapse difference by calculating difference between a processed baseline seismic survey and a processed monitor seismic survey acquired after injection of the gas fluid to obtain an image of a fractured stimulated rock volume.

18. The method of claim 13, wherein the time-lapse difference is root mean square amplitude difference.

* * * * *